United States Patent [19]

Allan

[11] Patent Number: 4,789,291

[45] Date of Patent: Dec. 6, 1988

[54] DENESTING APPARATUS

[75] Inventor: William W. Allan, Yakima, Wash.

[73] Assignee: Packaging Corporation of America, Evanston, Ill.

[21] Appl. No.: 63,171

[22] Filed: Jun. 17, 1987

[51] Int. Cl.$^4$ .............................. B65H 3/22
[52] U.S. Cl. .................................. 414/128; 221/213; 414/129
[58] Field of Search .................. 221/34, 60, 213, 214, 221/215; 414/125, 128, 129, 728, 732, 751

[56] References Cited

U.S. PATENT DOCUMENTS 2,444,389  6/1948  Wagner .............................. 221/215
4,134,521  1/1979  Pecht ................................... 221/213

Primary Examiner—Robert J. Spar
Assistant Examiner—Janice Krizek
Attorney, Agent, or Firm—Neuman, Williams, Anderson & Olson

[57] ABSTRACT

An apparatus is provided for automatically denesting an article from a stack of nested articles. The apparatus includes a frame supporting the stack of articles in an elevated downwardly inclined position relative to a conveyor unit defining a substantially horizontal plane. Adjustably mounted on the frame for controlled movement along a path inclined upwardly towards the lower end article of the supported stack is a carrier unit. Carried on the carrier unit are elements adjustable independently of the unit between operative and inoperative modes. When the carrier unit approaches the upper limit of its upward movement along the path, the elements carried thereby are adjusted to an operative mode and frictionally engage the lowermost article of the stack and cause the latter to be denested from the stack as the carrier unit commences its downward movement along the path. The elements are adjusted to an inoperative mode when the carrier unit has moved downwardly a predetermined distance along the path thereby releasing the denested article onto the conveyor unit. When the carrier unit assumes a normal rest position, it is disposed beneath the horizontal plane.

14 Claims, 8 Drawing Sheets

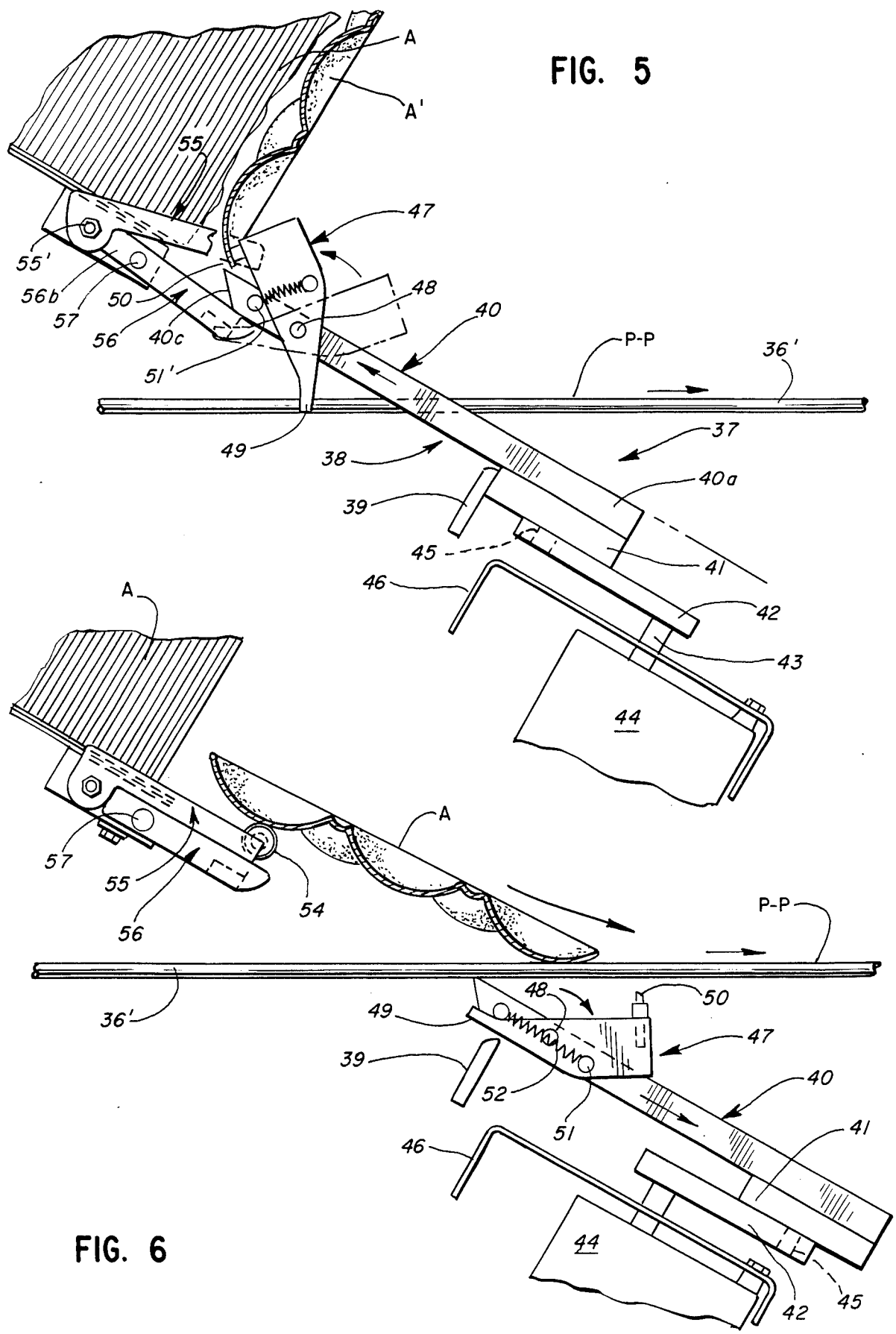

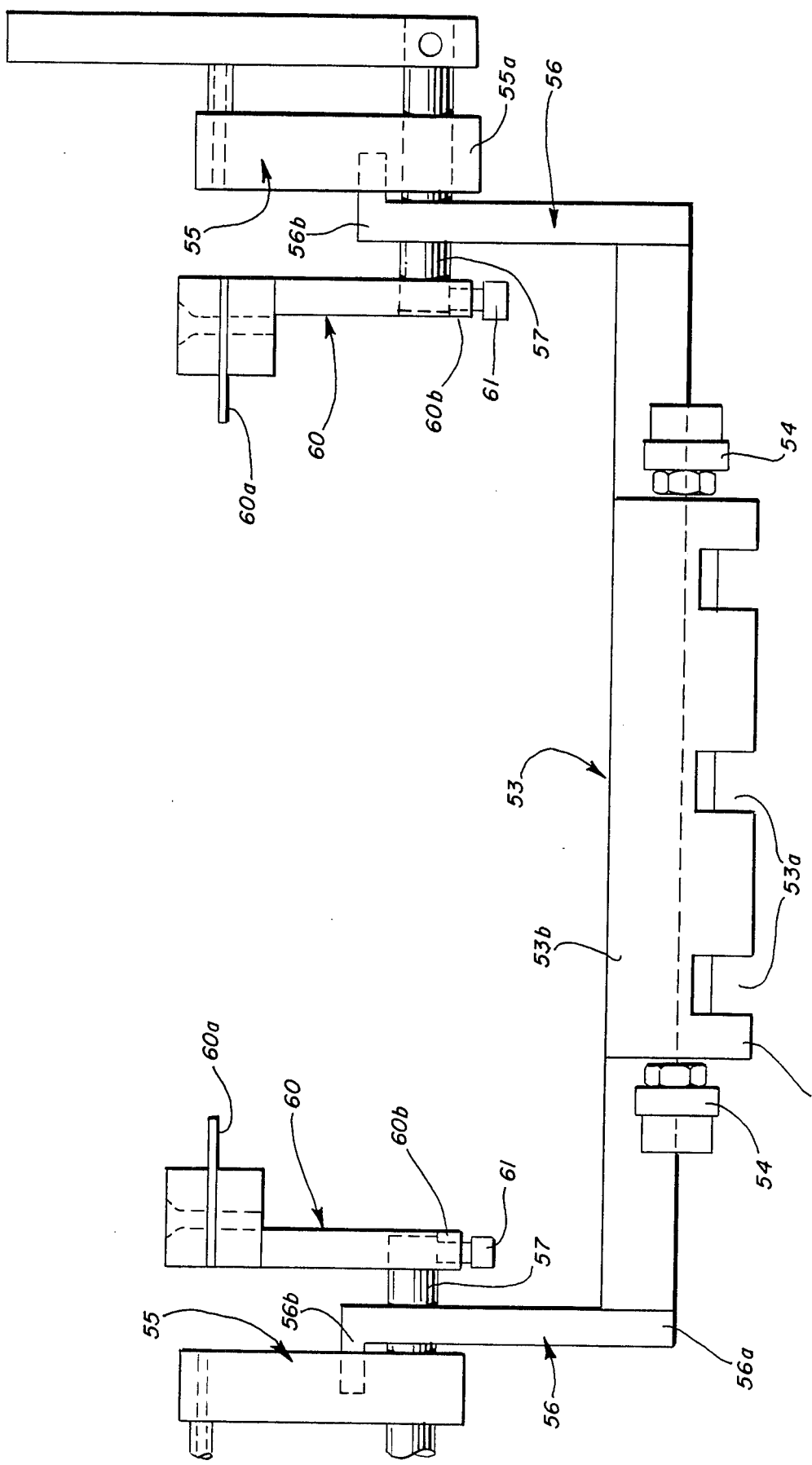

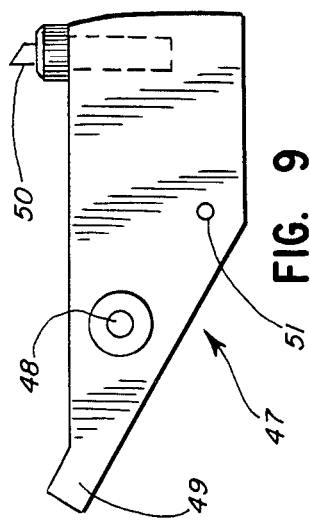

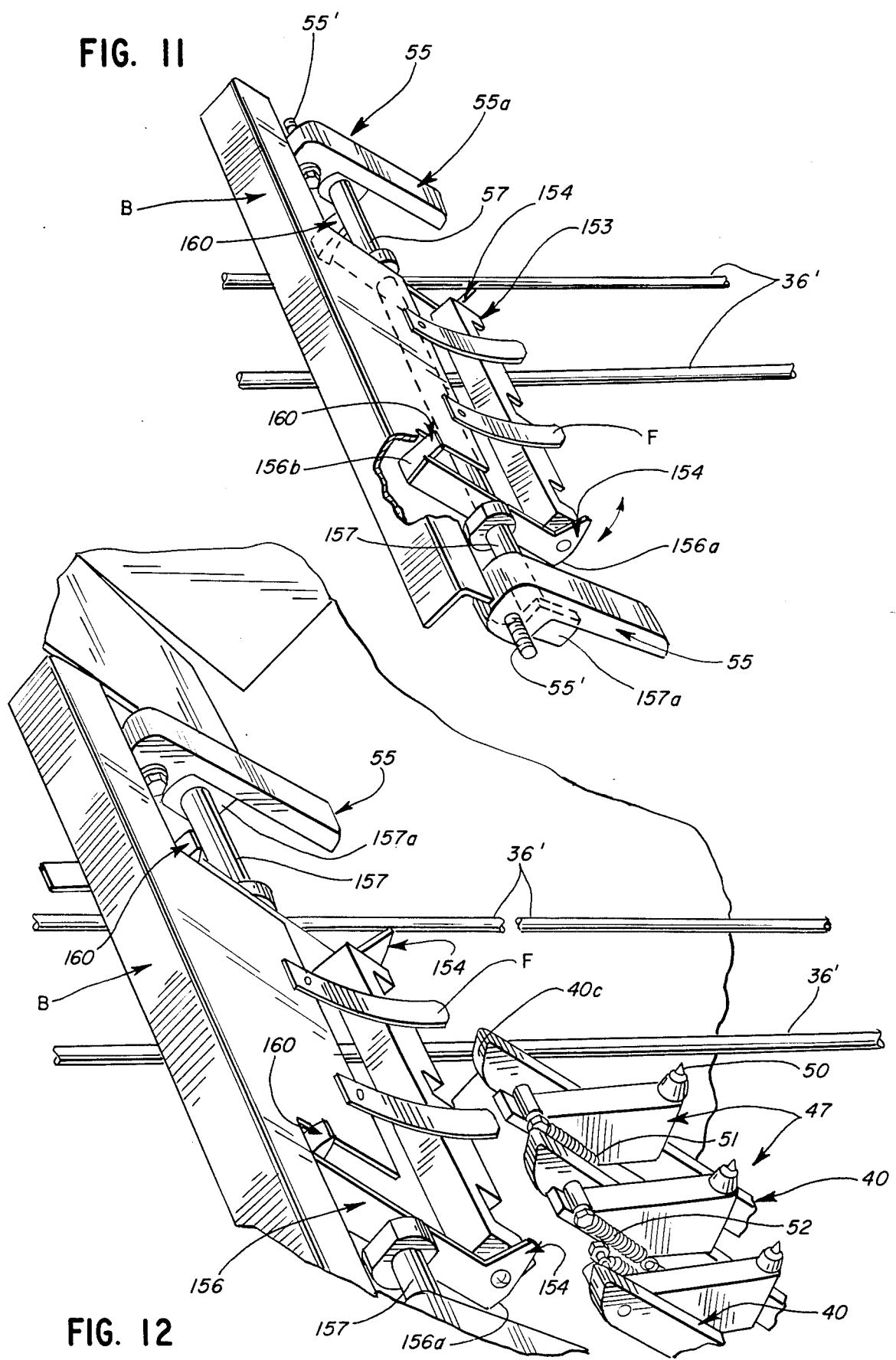

DENESTING APPARATUS

BACKGROUND OF THE INVENTION

The denesting of articles (e.g. fruit trays) from a stack of nested articles has heretofore been an operation normally involving a substantial amount of manual effort. In commercial fruit packing plants, the manual denesting operation is a monotonous, oftentimes frustrating and awkward operation. Various apparatus have heretofore been developed to perform some of the manual manipulations involved in denesting; however, such apparatus are beset with one or more of the following shortcomings: (a) the apparatus is of costly and complex construction; (b) it is susceptible to frequent breakdown and requires an inordinate amount of servicing and maintenance; (c) it is not capable of being readily adjustable to accommodate articles varying in size and shape over a wide range; and (d) it is not readily adapted to vary denesting patterns so as to coordinate with other packing procedures.

SUMMARY OF THE INVENTION

Thus, it is an object of the invention to provide a denesting apparatus which avoids the aforementioned shortcomings associated with prior apparatus of this general type.

It is a further object to provide a denesting apparatus which utilizes simple, mechanical components conveniently located for ease of servicing and adjusting when required.

It is a further object to provide a denesting apparatus which is capable of accommodating a variety of articles formed of various types of material.

It is a still further object to provide a denesting apparatus which is capable of high speed operation and requires only a conventional electrical power source (e.g. 115 volts).

Further and additional objects will become apparent from the description, accompanying drawings and appended claims.

In accordance with one embodiment of the invention, an improved denesting apparatus is provided which includes an upright frame on which is mounted a first means for supporting a stack of nested articles, such as molded pulp fruit trays, in an elevated, downwardly inclined position relative to a substantially horizontal plane. An endmost article of the stack faces the horizontal plane. Mounted on the frame and subtending the supported stack of nested articles is a conveyor unit which defines the substantially horizontal plane. A carrier means is mounted on the frame for controlled reciprocatory movement along a path inclined upwardly towards the supported stack of nested articles. Mounted on the carrier means for movement independently thereof between operative and inoperative modes is a third means. When in an operative mode, the third means is adapted to frictionally engage the lower endmost article of the supported stack whereupon as the carrier means initially moves downwardly along the path away from the supported stack, the engaged article will be denested from the remainder of the articles forming the stack. When the third means has travelled downwardly along the path a predetermined distance, the third means will be automatically moved from the operative mode to the inoperative mode whereupon the denested article is released from the third means and deposited on the conveyor unit. DESCRIPTION For a more complete understanding of the invention, reference is made to the drawings wherein FIG. 1 is a fragmentary side perspective view of one form of the improved denesting apparatus showing two stacks of nested articles supported in tandem relation.

FIG. 5 is an enlarged fragmentary side elevational view of one carrier means in its uppermost position relative to the stack of articles and the third means thereof engaging the endmost article of the stack; the mechanism of FIG. 3 is shown in an operative mode whereby the endmost article will clear certain retaining elements.

FIG. 6 is similar to FIG. 5 but showing the carrier means in its lowermost position relative to the stack of articles whereby the denested article is being deposited on a segment of a conveyor.

FIG. 7 is an enlarged fragmentary top plan view per se of a component which effects movement of the third means from an inoperative mode to an operative mode and actuation of the mechanism which effects clearance of the denested article with respect to certain retaining elements.

FIG. 8 is an enlarged fragmentary top plan view of various components of the carrier means.

FIG. 9 is an enlarged side elevational view of one of the components comprising the third means shown in FIG. 8.

FIG. 11 is an enlarged fragmentary perspective side view looking downstream of various components per se of a modified mechanism for lifting portions of the endmost article of a stack and for pushing the endmost article past certain retaining elements during predetermined periods of operation of the denested apparatus.

FIG. 12 is an enlarged fragmentary perspective side view, similar to FIG. 11, but showing the carrier means approaching its uppermost position relative to the stack of nested articles.

Figure 1:
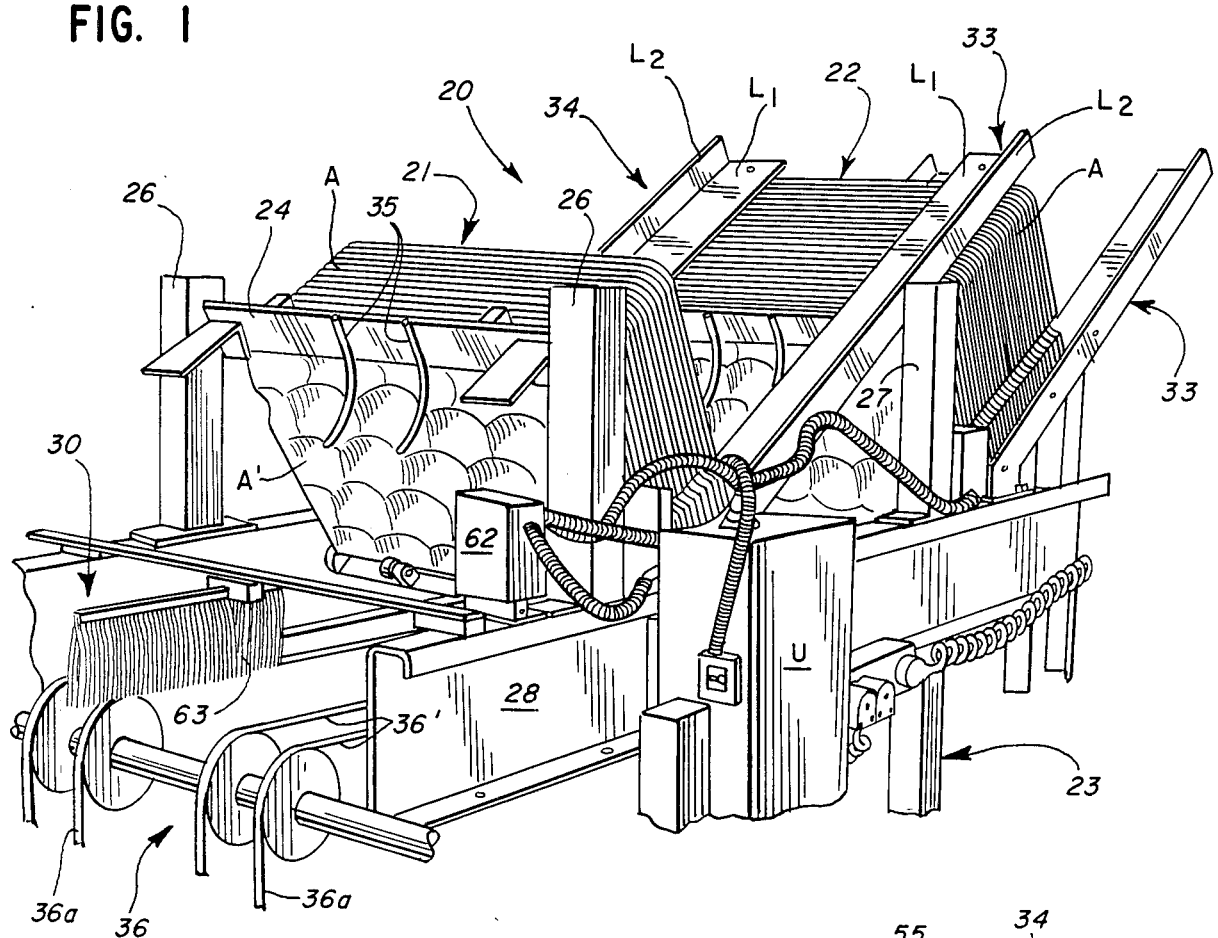

Referring now to the drawings and more particularly to FIG. 1, one embodiment of the improved apparatus 20 is shown for automatically denesting successive articles A, (e.g. molded pulp fruit trays) from stacks 21 and 22; each of the latter comprising a plurality of nested articles. The apparatus 20 includes an upright frame 23 which is provided with a pair of support assemblies 24,25 arranged in horizontally spaced, tandem relation. Each support is of similar construction and, as illustrated, is adapted to retain a stack 21 or 22 in an elevated, downwardly inclined relation with respect to a horizontal plane P—P disposed therebeneath. Each support assembly includes a pair of upright, front posts 26 and a pair of upright, rear posts 27. In the rear support assembly 25, the rear posts 27 of assembly 24 serve as the front posts for assembly 25, otherwise the assemblies are the same. Each pair of posts are disposed in laterally spaced relation and extend upwardly from a pair of relatively spaced, parallel, horizontally extending channel-like frame members 28,30. The frame members are disposed on opposite sides of an article A' subsequent to the latter being denested from a supported stack, see FIG. 6.

Figure 10:
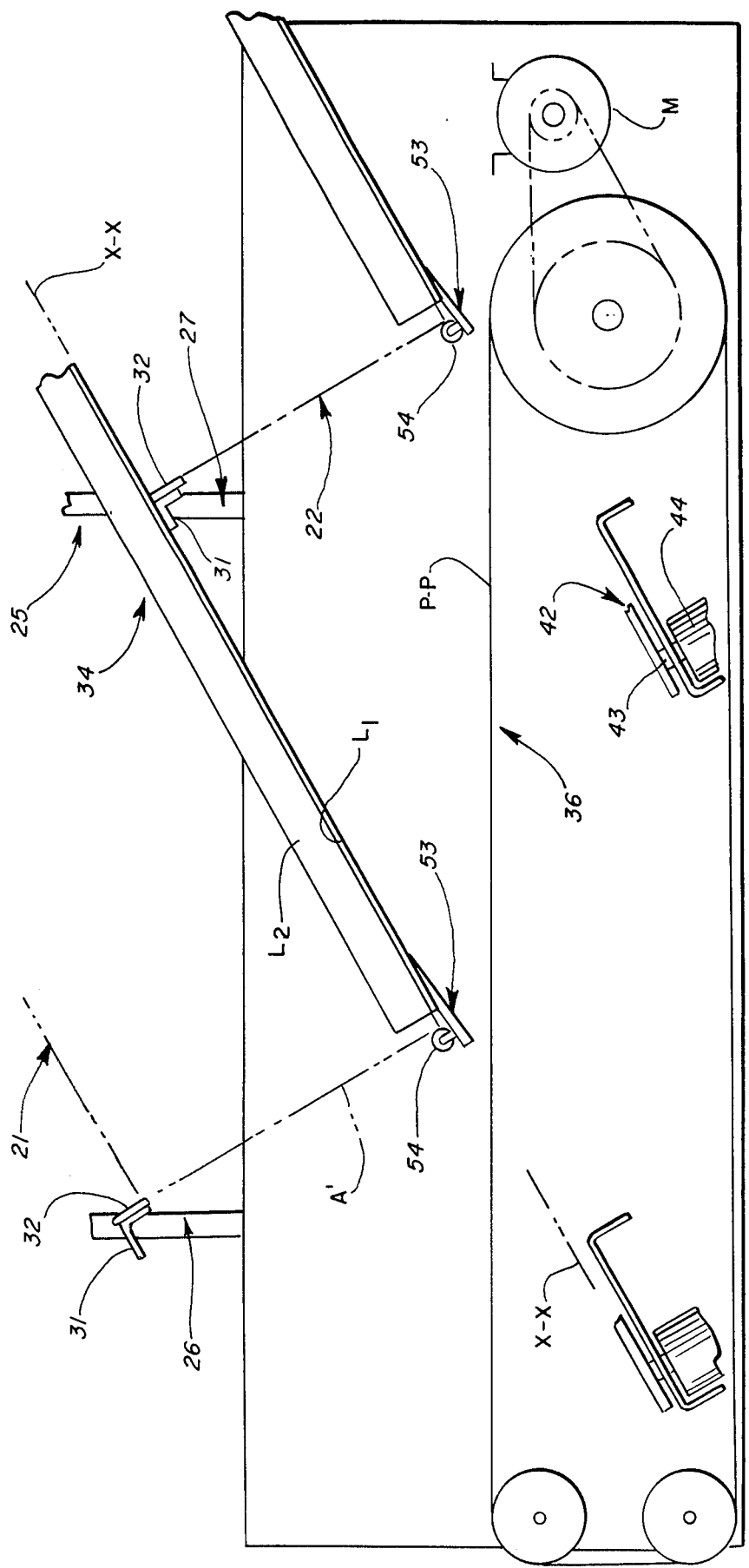
FIG. 10 is an enlarged fragmentary side elevational view showing the tandem arrangement of the stack-supporting means.
Figure 13:
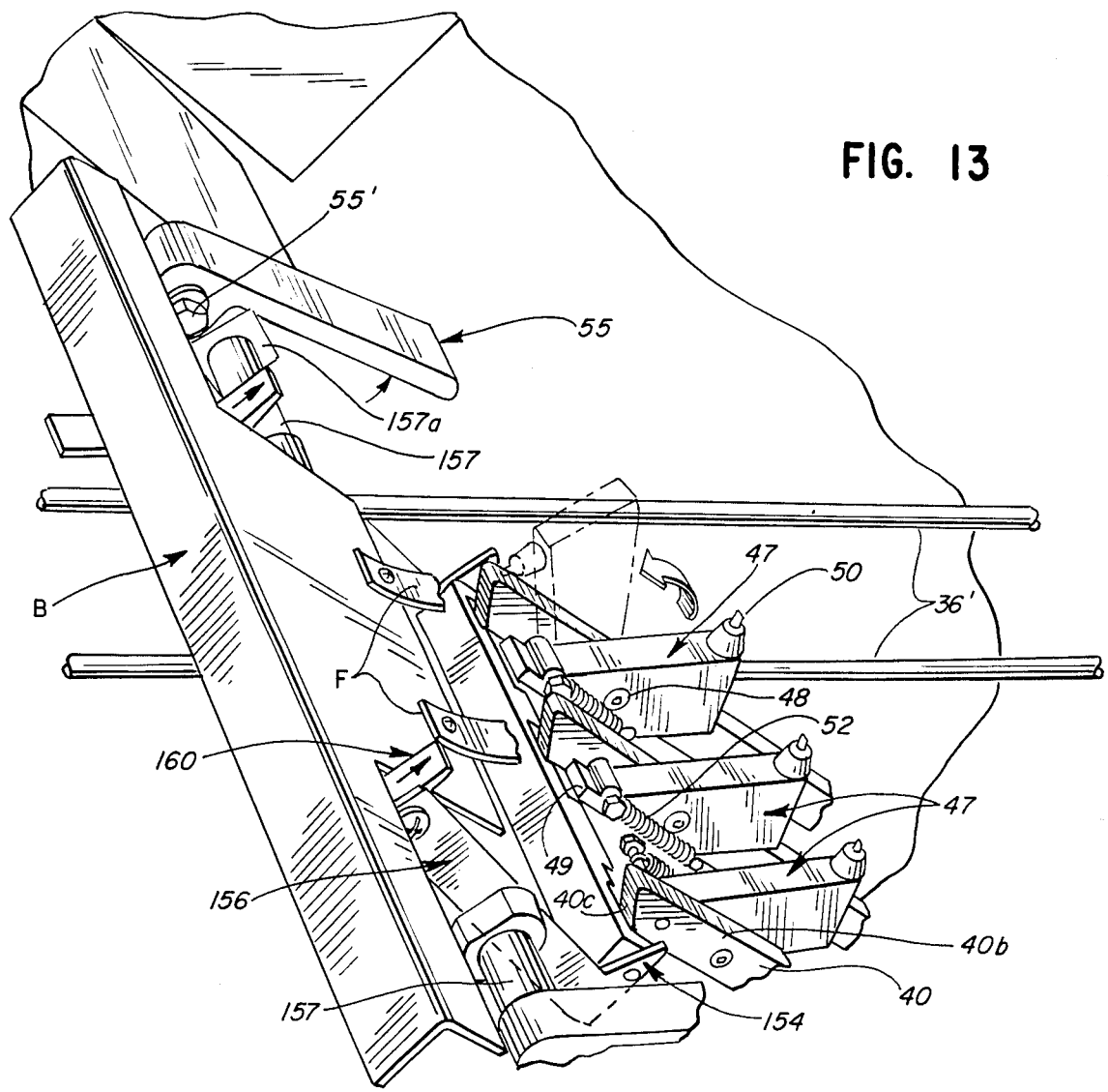
FIG. 13 is similar to FIG. 12 but showing the third means of the carrier about to be activated to an operative mode.
Figure 14:
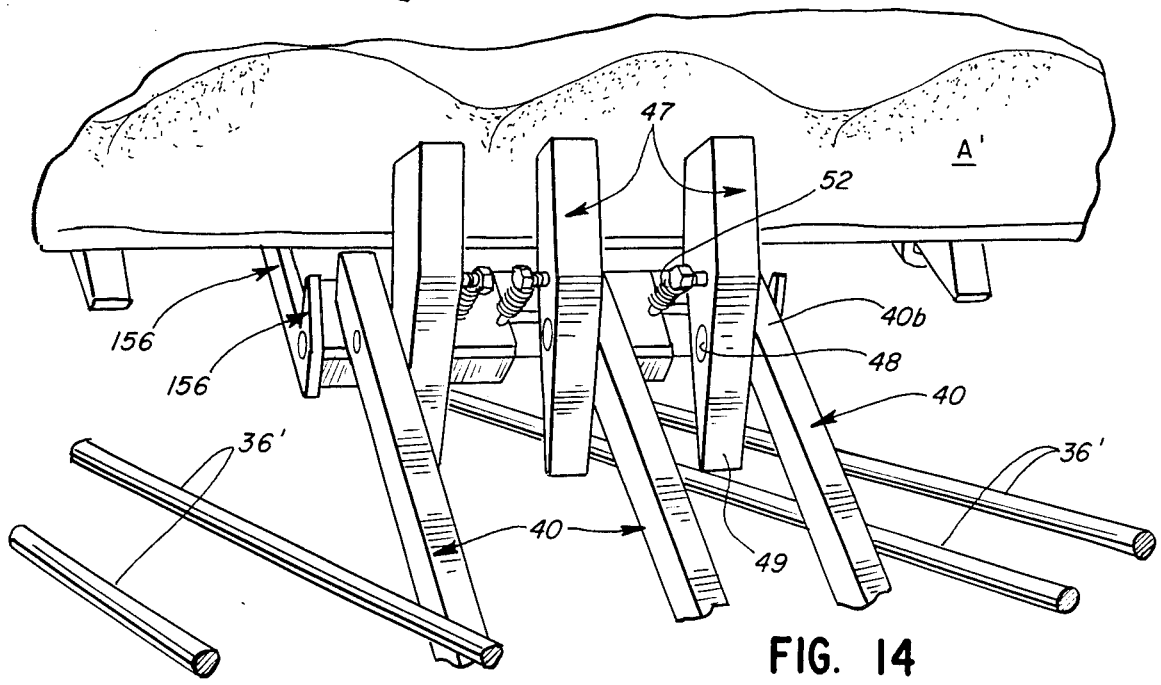
FIG. 14 is an enlarged fragmentary perspective view looking upstream towards the stack of nested articles and showing the lower endmost article of the supported stack being engaged by the third means of the carrier means.

The upper end portions of the front pair of posts 26 of assembly 24 are interconnected by a cross member 31. The backside of the cross member 31 is provided with a pair of laterally spaced pads 32, see FIG. 10. The upper peripheral portion of the endmost article A' of the stack 21 rests against the pads prior to the endmost article being denested from the stack. The lower edge portions of the articles of the stack are supportingly engaged by inclined guide members 33,34, see FIGS. 1 and 2. Each guide member is of like construction and is substantially L-shaped in cross-section with the long leg portion $L_1$, subtending the articles of the stack and the short leg portion $L_2$ disposed to the outside of the side edges of the stacked articles. The short leg portions $L_2$ coact to prevent lateral shifting of the supported stack. The exposed surfaces of leg portions $L_1$ and $L_2$ are preferably polished or coated with a non-friction material (e.g. Teflon) so as to reduce to a minimum frictional resistance to downward sliding movement of the stack as each endmost article is denested therefrom. The guide members 33,34 are downwardly inclined at an angle of approximately 30° to the horizontal plane P—P. The guide members are retained at the inclined positions by the rear pair of posts 27.

As seen in FIG. 1, the front side of each cross member 31 is provided with downwardly and forwardly projecting plows 35 which engage the upper edge portion of the denested article and cause the latter to fall rearwardly onto the upper section 36' of a conveyor 36. The conveyor upper section defines the aforementioned horizontal plane P—P.

Mounted on frame 23 is a carrier assembly 37, see FIGS. 5, 6 and 8 which includes a carrier unit 38 mounted for reciprocatory movement along a path X—X inclined upwardly towards the supported stack of nested articles. There is a like carrier assembly for each stack of articles. The carrier unit 38 includes a plurality of relatively spaced, upwardly inclined, parallel rod-like members 40, see FIG. 2. Each member 40 has the lower end 40a thereof affixed to a movable block 41 which remains beneath the plane X—X while the unit 38 reciprocates along path X—X. The block is actuated by a rotating crank arm 42 which has one end thereof keyed to the rotating drive shaft 43 of an electric motor 44, see FIGS. 5, 6, 8 and 10. The opposite end of the crank arm 42 is provided with a transversely extending pin 45. The pin is slidably disposed within an elongated slot 41a formed in block 41. The slot is disposed transversely relative to the direction of movement of the block along path X—X. In the illustrated embodiment, the motor 44 is a non-reversible type. In lieu of the non-reversible motor, a reversible motor, not shown, may be utilized and in lieu of the crank arm and slot, a rack and pinion assembly may be employed wherein the rack is carried by the block 41 and the pinion attached to the motor drive shaft 43. In some installations, hydraulic motors, not shown, may be substituted for electric motors.

Figure 4:
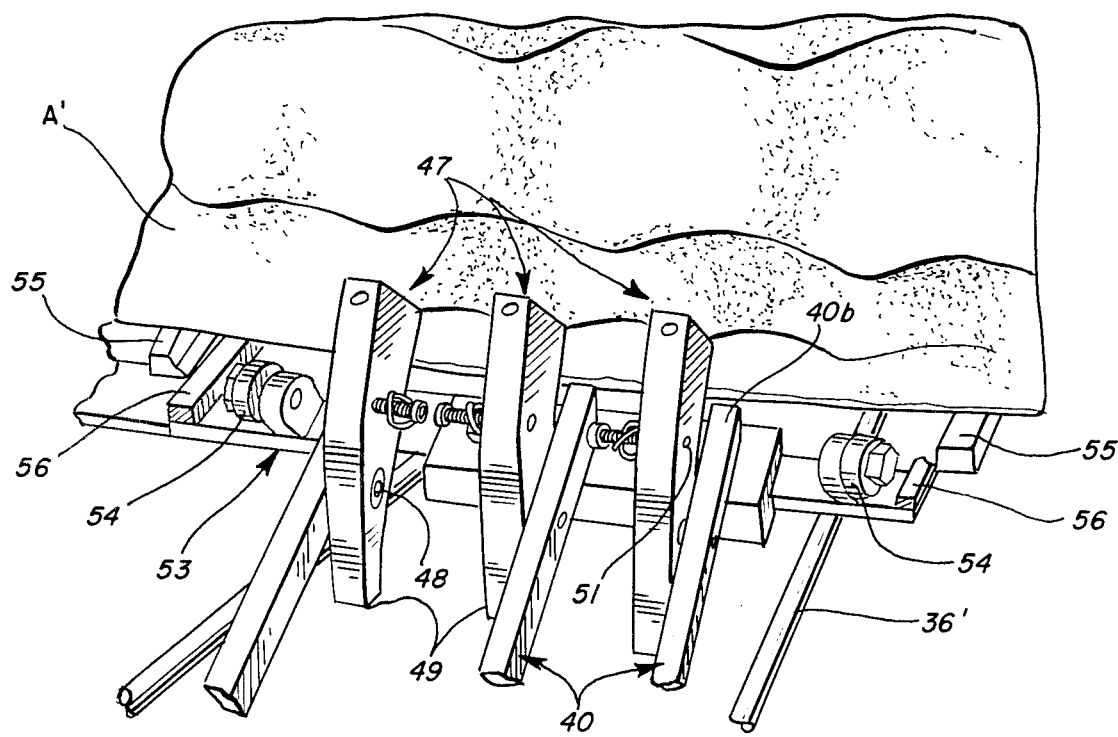
FIG. 4 is an enlarged fragmentary perspective view showing the third means engaging the endmost article of the stack of nested articles preparatory to the engaged article being denested from the stack.

The motor 44 is suitably mounted on a cross bracket 46, see FIGS. 5 and 6 supported by the frame 23 and located beneath the plane P—P. The rod-like members 40 are disposed between narrow belts 36a forming components of conveyor 36, see FIG. 2. Carried on the upper, or distal, end portion 40b of each rod-like member 40 and mounted thereon for independent, pivotal movement is an article engaging unit 47. Each unit 47 moves with the corresponding rod-like member 40 along the inclined path X—X, but, during certain segments of travel along the path, moves independently of the rod-like member about a pivotal axis 48 between an operative mode I, FIG. 4, and an inoperative mode II, FIG. 2. All the units 47 move in unison with one another between the operative and inoperative modes.

As seen in FIG. 9, each unit 47 is provided at one end thereof with a transversely extending pointed protuberance 50. When unit 47 is in the operative mode I, the end of the protuberance 50 will frictionally engage an exposed surface of the lower, peripheral portion of the endmost article A' of the supported stack 21,22, see FIGS. 4 and 5. When the unit 47 is in the inoperative mode II, the protuberance 50 is disengaged from the denested article and the carrier unit 38 is substantially disposed beneath the horizontal plane P—P, see FIGS. 2 and 6. Projecting laterally from one side of unit 47 is a stub 51 to which is connected one end 52a of a coil spring 52 see FIGS. 5, 6 and 8. The opposite end 52b of the spring 52 is connected to a pin 51' carried adjacent the upper free end portion 40b of the corresponding rod-like member 40. When the unit 47 is in the operative mode I, spring 52 is in a substantially unloaded (low tension) condition and, when the unit 47 is in an inoperative mode, the spring is in a loaded (high tension) condition. Because of the relative locations of the unit pivotal axis 48 and the stub 51 and pin 51', the spring 52 will cause the unit 47 to only assume either the inoperative or operative mode depending upon the relative segment of travel of the unit along the path X—X.

Figure 2:
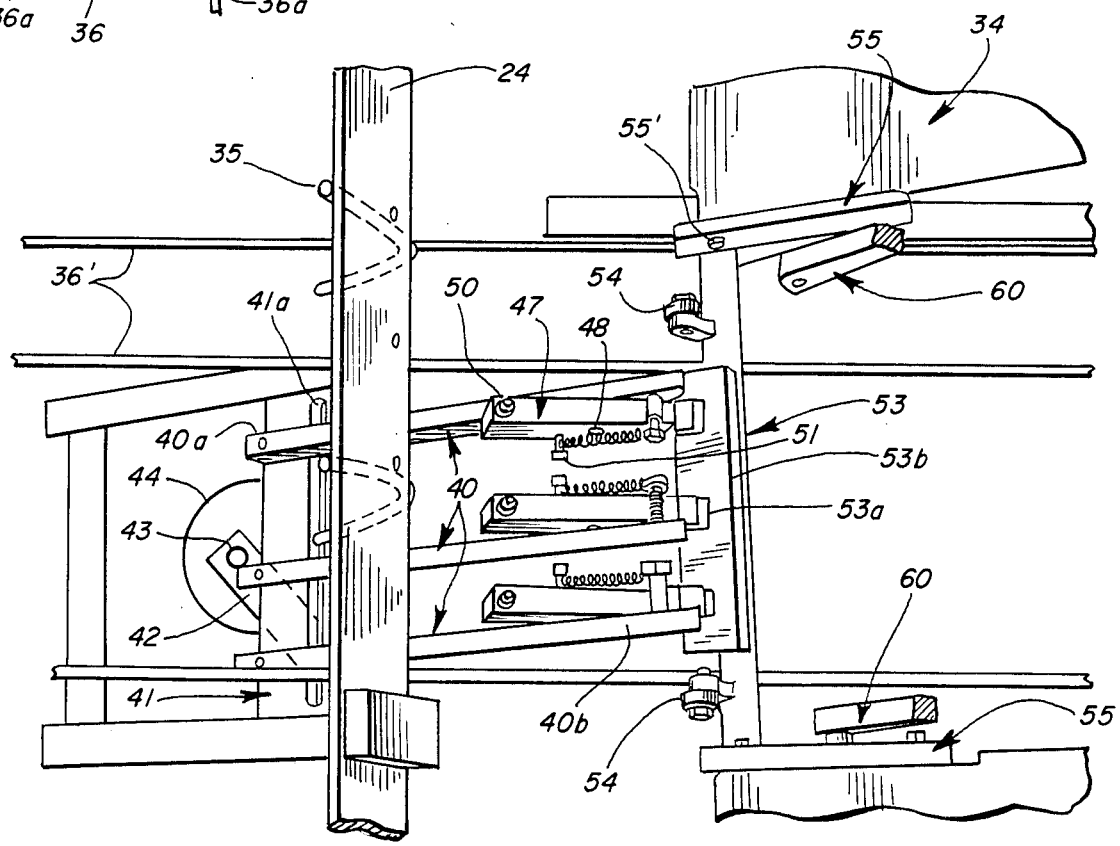
FIG. 2 is a fragmentary top view of the apparatus of FIG. 1 void of nested articles and showing only one of the stack-supporting means and with one carrier means approaching a position wherein the third means are to be activated from an inoperative mode to an operative mode.
Figure 3:
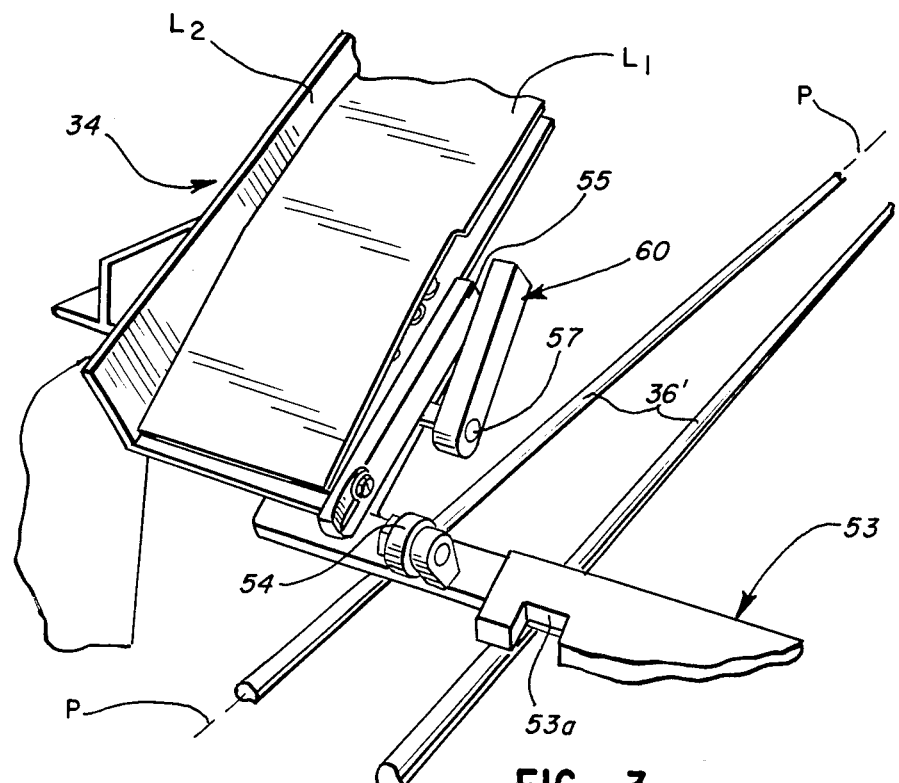
FIG. 3 is an enlarged fragmentary perspective view of the mechanism for effecting clearance of the denested article with respect to a stack-retaining element.

To effect pivoting of each unit 47 from an inoperative mode II to an operative mode I, there is provided a transversely extending, pivotally mounted trigger bar assembly 53 which is located in close proximity to, but spaced from, the endmost article of the supported stack of nested articles 21 or 22 and adjacent the path X—X travelled by the rod-like members 40, see FIG. 2. As the rod-like members approach the upper end limit of travel along path X—X, the end 49 of each unit 47 will engage a corresponding recessed cam portion 53a formed in a transversely extending trigger bar 53b and cause the unit 47 to pivot to an operative mode, as the rod-like members continue their upward movement to the upper end limit of the path. Simultaneously with the continued upward movement of the members 40, the latter will engage portions 53c of the bar 53b, adjacent the cam portions 53a and cause the trigger bar assembly to pivot downwardly about a pivot axis 57 as will be described more fully hereinafter. Upon the rod-like members 40 commencing their downward movement along path X—X from their upper end limit portions, the carrier units pull the engaged lower peripheral portion of the endmost article A' away from the remaining articles of the stack until the entire endmost article is separated from the stack, see FIGS. 5 and 6.

To facilitate movement of the engaged endmost article past a pair of stops 54, a pair of pivotally mounted lift levers 55 are provided which, when actuated, distort upwardly the opposite end portions of the lower peripheral edge of the engaged endmost article and allow the article to slide over the stops 54 as the rod-like members 40 and units 47 move in unison down the inclined path X—X. The lift levers 55, as seen in FIG. 7 are disposed in horizontally spaced relation and each lever is mounted on an adjacent frame segment for pivoting about a pin 55' projecting from the frame segment. The levers 55 are simultaneously pivoted upwardly into an operative mode by a pair of rocker arms 56 disposed at opposite ends of the trigger bar 53a, see, FIG. 5. Each arm is affixed to a shaft which defines axis 57. The shaft is journalled to and supported by an adjacent portion of the frame. One end 56a of each rocker arm is affixed to an adjacent end portion of the trigger bar 53. Also affixed to and protruding upwardly from each end portion of the trigger bar 53a is the pair of roller stops 54. As seen in FIGS. 5 and 7, the opposite end 56b of rocker arm 56 extends beyond shaft 57 and is provided with an offset portion which engages the underside of the adjacent lift lever 55.

It will be noted in FIG. 5 that the axis of pivot pin 55' of the lift lever 55 is in spaced, parallel relation to the pivot shaft 57 of the trigger bar assembly 53. When in an inoperative mode the lift levers assume a substantially parallel relation with respect to plane X—X, see FIG. 6.

As aforementioned, pivoting of rocker arms 56 about shafts 57 is effected by the trigger bar 53a being depressed by the leading distal ends 40b of the rod-like members 40 upon the latter reaching a predetermined point of upward travel along path X—X. As seen in FIG. 5, the underside of the distal end portion 40b of each rod-like member 40 is chamfered so as to form a cam surface 40c. As the cam surfaces slide across the upper surface of the trigger bar portions 53c, the bar 53b is depressed thereby resulting in the free ends 55a of lift levers to be raised by arm ends 56b an amount sufficient to cause the end portions of the bottom edge of the endmost article A' of the stack to be distorted upwardly so as to readily pass over the roller stops 54 as the article A' is pulled downwardly away from the remaining articles of the stack, see FIG. 5.

To assist in article A' being denested by the units 47, there is provided a pair of pusher fingers 60 (see FIG. 7). Each finger 60 is keyed to the corresponding shaft 57 and extends generally radially therefrom so that as the finger pivots, the distal end 60a thereof swings in a generally forward direction engaging the underside or concealed side of the article A' and pushing same away from the supported stack. Thus, the pusher fingers 60 and lift levers 55 are simultaneously actuated upon the trigger bar 53b being depressed by the cam surfaces 40c of the rod-like members 40. The relative position of the pusher finger 60 with respect to shaft 57 may be readily adjusted by releasing a lock-screw 61 threaded into a longitudinally extending opening formed in the opposite end 60b of the finger 60. The concealed end of the screw 61 frictionally engages the exterior of shaft 57. Relative adjustment of the pusher fingers 60 is desirable so that the end 60a of each finger will make the most positive pushing contact with the article underside, even though the configuration of the latter may vary over a wide range.

When the carrier unit rod-like members 40 have moved downwardly from their upper end-limit positions, see FIG. 5, a predetermined distance along path X—X, the end 49 of each unit 47 will engage a fixed, transversely extending release bar 39 which will cause each unit to pivot to its inoperative mode, as seen in FIG. 6.

As aforementioned, in many packing plants utilizing the instant denesting apparatus, it is desirable to simultaneously denest articles from two or more stacks 21,22 of nested articles. As shown in FIG. 1, the two stacks of nested articles (e.g. fruit trays) are supported in aligned, tandem relation above the plane P—P of conveyor 36. Where two stacks 21 and 22 are supported on the frame, it may be desirable for the trays of one stack to be turned 180° relative to the articles of the other stack, so that when the loaded trays are placed in a conventional shipping box, proper cushioning and protection of the produce accommodated by the trays are obtained. To facilitate proper packing of the loaded trays within the shipping container, the trays denested from each supported stack are arranged in a predetermined pattern (e.g. successive trays turned 180° ) on the conveyor section 36'. Subsequent to being deposited on conveyor 36, the trays are moved to a loading station wherein the trays are loaded either manually or automatically prior to reaching the location where the loaded trays are deposited into a shipping container.

In order to assure that a predetermined pattern of the articles on the conveyor 36 is maintained, a sensor device 62 is provided which, in the illustrated embodiment, is mounted on the frame adjacent the pair of front upright posts 26, see FIG. 1. The sensing device 62 may be of a photoelectric cell type where a light emitter component and light beam receiver component for each supported stack are disposed on opposite sides of plane P—P and downstream of the supported stack. The sensor device is connected to a controller unit U, which, in turn, controls the operation of a drive motor M (FIG. 10), for the conveyor 36 and the operation of motor 44 for the carrier unit 38. When the units 47 carried by the rodlike members 40 have not made proper contact with the endmost article A' of a stack and an unexpected void in the article pattern occurs on the conveyor section 36', such void will be sensed by the sensor device 62 and a signal sent to the controller unit U, and the latter shuts down the conveyor motor or if a clutch is utilized with the conveyor motor M, the clutch is deactivated causing the drive to the conveyor to be cut off. Under such an operating abnormality, the motor 44 of the carrier assembly will continue to operate allowing the rod-like members for the stack in question to recycle a predetermined number of times. If proper contact with the endmost article A' of the stack has not been made after the predetermined number of recycles, the motor 44 will also be shut down and an audio and/or visual alarm will be activated alerting plant personnel to investigate the problem.

As seen in FIG. 1 there is mounted on frame 23, downstream of the support posts 26 for stack 21, a hold down device 63 which is disposed above plane P—P and is adapted to slidably engage the upper surface of each denested article as it passes therebeneath. The device 63 causes the denested article passing therebeneath to remain in proper contact with the upper section 36' of conveyor 36 and be moved thereby towards the next designated station not shown.

FIGS. 11-14 show various components of a modified feed mechanism 64 which may be substituted for the various components shown in FIG. 7. As seen in FIG. 11, a pair of rocker arms 156 are connected at corresponding ends 156a to opposite sides of an elongated trigger bar 153. The trigger bar may have a configuration such as shown in FIG. 7. The connected end 156a of each rocker arm 156 is provided with an upwardly projecting stop 154 which extends above the upper surface of the trigger bar. When the trigger bar assumes a non-depressed position the stops 154 engage the lower periphery of the endmost article and prevent the latter from accidentally becoming denested from the stack.

Each rocker arm 156 is keyed to a transversely extending shaft 157. The shaft 157 is supported by suitable bearings, not shown, which are mounted on the underside of a transversely extending bracket B. The bracket is disposed in a fixed position beneath the stack of nested articles and above the conveyor section 36'. The opposite end 156b of each rocker arm extends from the shaft 157 and is provided with an upwardly projecting pusher finger 160. When the trigger bar 153 is depressed, the pusher finger 160 will pivot upwardly and forwardly and contact the backside of the endmost article A' and push the latter away from the remaining articles of the stack. Simultaneously with the upward and forward pivoting of the pusher finger 160, the stops 154 will pivot downwardly with the depressed trigger bar and become disengaged from the periphery of the endmost article. It will be noted in FIG. 11 that the ends of shaft 157 protrude outwardly from the rocker arms 156 and terminate beneath the corresponding lift levers 55. Each shaft end 157a has a cam configuration. Thus, as the shaft 157 turns upon its axis the shaft ends 157a will cause the levers 55 to pivot about their respective pivot pin 55' which is supported by an adjacent frame segment.

It will be noted in FIG. 11 that a pair of resilient fingers F extend from the support bracket B towards the trigger bar 53. The distal or free end portion of each finger is curved upwardly and engages the bottom peripheral segment of the nested article adjacent to the endmost article and thus, prevents more than one article at a time being denested from a supported stack. It will be noted that the fingers F are disposed between the stops 154 and are positioned so as not to interfere with the movement of the rod-like members 40 along path X—X.

The shape and size of the various components heretofore described may vary from that shown without departing from the scope of the invention. Furthermore, while the improved apparatus has been described with relation to a molded fruit tray it is not intended to be limited thereto but may be utilized with a variety of nested articles wherein there is a lip, flap, flange or the like formed along the lower peripheral segment of the endmost article.

We claim:

1. An apparatus for successively denesting articles from a stack of nested articles, each article, when disposed at one end of the stack, having an exposed lower peripheral portion; said apparatus comprising an upright frame; first means mounted on said frame for supporting the stack of nested articles in an elevated, downwardly inclined position relative to a predetermined plane with the article at the stack one end facing towards the predetermined plane and having the exposed lower peripheral portion thereof adjacent to but spaced above said plane; second means defining said predetermined plane for conveying a denested article to a predetermined station; carrier means mounted on said frame downstream of the supported stack of nested articles for controlled reciprocatory movement along a path upwardly inclined relative to said predetermined plane towards the supported stack; third means carried by said carrier means and mounted thereon for independent movement between an operative mode wherein the exposed lower peripheral portion of the article to be denested is frictionally engaged by said third means and an inoperative mode wherein the third means is disengaged from the denested article lower peripheral portion; fourth means mounted on said frame for effecting independent movement of the third means from an inoperative mode to an operative mode when the carrier means is at a predetermined location of upward travel along said path and effecting independent movement of said third means from an operative mode to an inoperative mode when the carrier means is at a predetermined location of downward travel along said path, said third means when moving from said operative mode to said inoperative mode releasing the engaged denested article onto said second means whereby the latter conveys the denested article to said predetermined station.

2. The apparatus of claim 1 wherein the first means includes an element for retaining the remaining articles of the stack at a selected elevated location as the end article of the stack is engaged by the third means and denested from the stack upon the carrier means changing direction from upward travel to downward travel along the path.

3. The apparatus of claim 1 wherein the third means is provided with a protuberance which is adapted to frictionally engage the lower peripheral portion of the engaged article when said third means is in the operative mode.

4. The apparatus of claim 1 including a fifth means coacting with said carrier means and said third means for resiliently retaining the latter in either the operative or inoperative mode.

5. The apparatus of claim 1 wherein the carrier means includes an elongated rod-like element movable in an endwise direction along the path.

6. The apparatus of claim 5 wherein the third means is pivotally connected to a distal end of the rod-like element, said distal end being proximate the stack of nested articles upon the carrier means reaching an upper end limit of travel along the path.

7. The apparatus of claim 1 wherein the fourth means includes relatively spaced first and second units, said first unit being disposed adjacent said first means and engaged by said third means only when the carrier means is moving upwardly along the path, the second unit being spaced a greater distance from the first means than said first unit and engaged by said third means only when the carrier means is moving downwardly along the path.

8. The apparatus of claim 1 wherein the movement of the carrier means is effected by a motor mounted on the frame beneath the predetermined plane.

9. The apparatus of claim 8 wherein operation of the motor is regulated by control means which senses the presence of a denested article at a selected area on the second means; when no denested article is present at said area the motor is adapted to be energized, causing the carrier means to move from a normal rest position beneath the predetermined plane upwardly along the path towards the first means; when a denested article is present at the given area, the motor is not adapted to be energized and the carrier means remains in the normal rest position beneath said plane.

10. The apparatus of claim 1 wherein the first means includes two relatively spaced sections arranged in substantially tandem relation, each section being mounted on said frame and supporting a stack of nested articles in an elevated downwardly inclined position relative to the predetermined plane with the article at the one end of each stack facing towards the predetermined plane and having the exposed lower peripheral portion thereof adjacent said plane; the second means subtending and coacting with each section for simultaneously conveying a denested article from each supported stack to a predetermined common station, the conveyed denested article from one supported stack passing beneath the other supported stack before reaching said common station; each first means section coacting with independent carrier means, third means and fourth means; the carrier means, third means and fourth means for each first means section being sequentially activated by timing means whereby the disposition of the denested articles from the supported stacks are arranged on the second means in a selected sequence.

11. The apparatus of claim 10 wherein the timing means effects alternate disposition of the denested articles from the supported stacks on the second means.

12. The apparatus of claim 10 wherein the denested article form one supported stack is disposed on the second means at a predetermined angle relative to the denested article from the other stack.

13. The apparatus of claim 1 wherein the first means includes a pair of laterally spaced downwardly inclined guide means subtending and supportingly engaging corresponding spaced segments of the lower peripheral portions of the nested articles of the stack, said guide means being disposed on opposite sides of the path of movement of said carrier means.

14. The apparatus of claim 13 wherein the first means includes article-stop means disposed adjacent a lower end portion of each guide means; and adjustably mounted lift means adjacent each article-stop means and adapted, when in one position of adjustment, to raise the lower peripheral portion of the article disposed at the lower end of the supported stack relative to the article-stop means whereby the lower end article when engaged by the third means will move past said article-stop means when the carrier means commences its downward movement along the path and effects denesting of the lower end article from the stack.

* * * * *